United States Patent
Suh et al.

(10) Patent No.: US 10,013,176 B2
(45) Date of Patent: Jul. 3, 2018

(54) METHOD AND APPARATUS FOR PARALLEL PROCESSING DATA INCLUDING BYPASSING MEMORY ADDRESS ALIAS CHECKING

(71) Applicant: SAMSUNG ELECTRONICS CO., LTD., Suwon-si (KR)

(72) Inventors: Dong-kwan Suh, Yongin-si (KR); Suk-jin Kim, Seoul (KR); Young-hwan Park, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 15/090,111

(22) Filed: Apr. 4, 2016

(65) Prior Publication Data

US 2017/0123658 A1    May 4, 2017

(30) Foreign Application Priority Data

Nov. 4, 2015 (KR) .................. 10-2015-0154758

(51) Int. Cl.
*G06F 3/06* (2006.01)
*G06F 12/00* (2006.01)

(52) U.S. Cl.
CPC ........... *G06F 3/061* (2013.01); *G06F 3/0656* (2013.01); *G06F 3/0659* (2013.01); *G06F 3/0673* (2013.01); *G06F 12/00* (2013.01)

(58) Field of Classification Search
CPC ...... G06F 3/061; G06F 3/0656; G06F 3/0659; G06F 3/0673; G06F 12/00
See application file for complete search history.

(56) References Cited

U.S. PATENT DOCUMENTS

| | | | | |
|---|---|---|---|---|
| 2003/0196048 A1* | 10/2003 | McAllister | .......... | G06F 12/1045 711/147 |
| 2008/0288744 A1* | 11/2008 | Gonion | .............. | G06F 9/30072 711/210 |
| 2012/0151156 A1* | 6/2012 | Citron | ................ | G06F 9/30043 711/154 |
| 2013/0212354 A1* | 8/2013 | Mimar | ............... | G06F 9/30021 712/4 |
| 2015/0046448 A1 | 2/2015 | Bahns | | |

FOREIGN PATENT DOCUMENTS

WO    WO 9806039 A1 *    2/1998    ......... G06F 9/30072

* cited by examiner

*Primary Examiner* — Glenn Gossage
(74) *Attorney, Agent, or Firm* — Staas & Halsey

(57) ABSTRACT

Methods and apparatuses for parallel processing data are disclosed. One method includes reading items of data from a memory using at least memory access address, confirming items of data with the same memory address among the read items of data, and masking the confirmed items of data other than one of the confirmed items of data. A correction value is generated for the memory access address using the confirmed items of data, and an operation is performed on data that has not been masked using the confirmed items of data and the correction value. Data obtained by operating on the data that has not been masked is stored as at least on representative data item for the data items with the same memory address. A schedule of a compiler of a processor is adjusted by performing bypassing of memory access address alias checking for at least one memory access address.

13 Claims, 4 Drawing Sheets

```
for (i = 0; i < BIN_COUNT; i++)
    bin[i] = 0;

for (i = 0; i < N; i++)
    bin[data[i]]++;
```

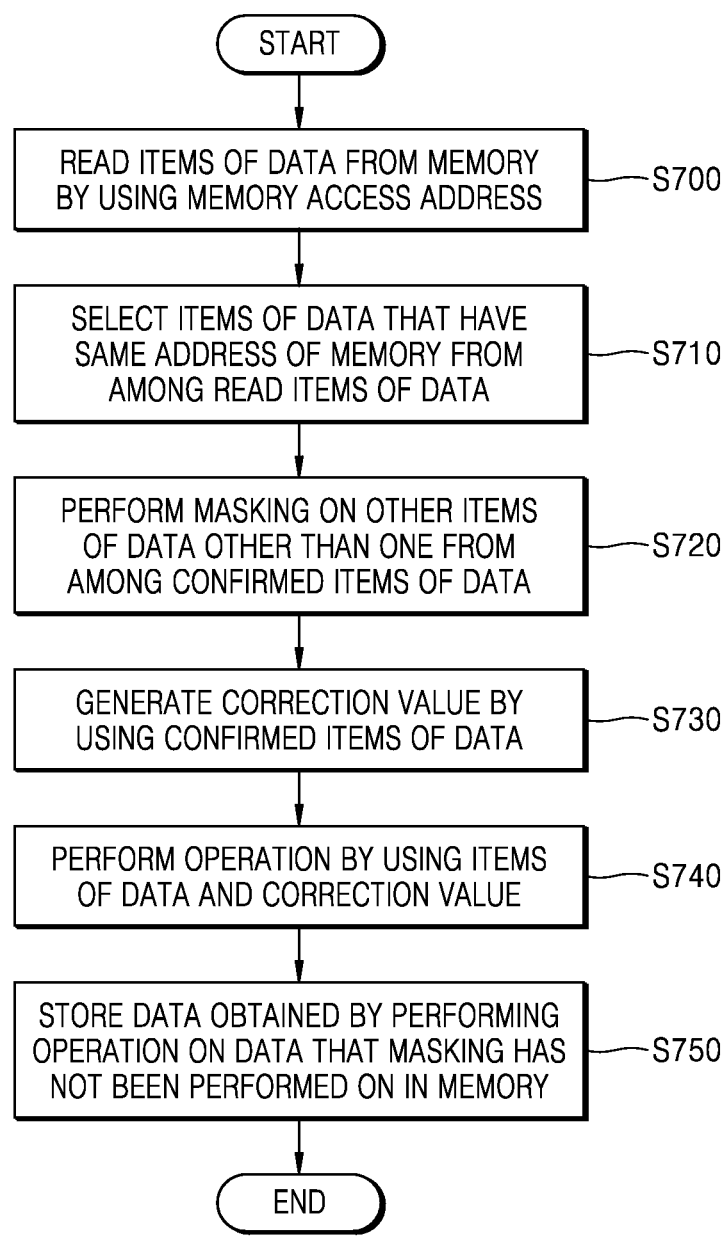

METHOD AND APPARATUS FOR PARALLEL PROCESSING DATA INCLUDING BYPASSING MEMORY ADDRESS ALIAS CHECKING

CROSS-REFERENCE TO RELATED APPLICATION

This application claims the benefit of Korean Patent Application No. 10-2015-0154758, filed on Nov. 4, 2015, in the Korean Intellectual Property Office, the disclosure of which is incorporated herein by reference in its entirety.

BACKGROUND

1. Field

The present disclosure relates to methods and apparatuses for parallel processing data.

2. Description of the Related Art

As resolutions of digital televisions (TVs) and smartphones increase, the amount of image data used for image processing has increased, and algorithms also have become more complicated. Thus, a large amount of data has to be simultaneously processed quickly in real-time. Accordingly, efficiently processing a kernel function or functions for image processing has become important.

A compiler of a processor that uses a very long instruction word (VLIW) or a coarse-grained array (CGA) structure degrades when the compiler considers memory dependency and thus performs conservative scheduling. Such a problem becomes serious when an unpredictable memory operation such as a pointer variable is scheduled.

SUMMARY

Provided are methods and apparatuses for parallel processing data.

Provided are non-transitory computer-readable recording media having recorded thereon computer programs for executing the above methods.

Additional aspects will be set forth in part in the description which follows and, in part, will be apparent from the description, or may be learned by practice of the presented embodiments.

According to an aspect of an embodiment, a method of parallel processing data includes: reading items of data from a memory by using at least one memory access address and confirming items of data that have a same memory address in the memory from among the read items of data; the masking confirmed items of data other than one from among the confirmed items of data; generating a correction value by using the confirmed items of data; performing an operation by using the confirmed items of data and the correction value; and storing, in the memory, data obtained by performing the operation on the confirmed data items that have not been masked to store the obtained data as at least one representative data item for the data items having the same memory address upon the bypassing of memory address alias checking for the at least one memory access address.

The generating of the correction value may include determining a number of the confirmed items of data.

The data may include data regarding a weighted histogram, and the generating of the correction value may include generating a weighted value by using the determined number.

The generating of the correction value may include generating a correction value by using the generated weighted value.

the reading may include reading the items of data from the memory by using a vector-gather method in which one or more incoming items of data are distributed among one or more buffers.

The storing may include storing the data in the memory by using a vector-scatter method in which items of data are collected from buffers and stored as one item of data.

The memory may include at least one of a register file, a collection of memory banks of a dual port memory, and a single port memory, and the single port memory may include a write buffer and may perform memory read and memory write simultaneously.

The method may further include adjusting a schedule of a compiler of the process by performing bypassing of memory address alias checking for the at least one memory access address.

According to an aspect of another embodiment, an apparatus for parallel processing data using bypassing of memory address alias checking includes: a processor configured to read items of data from a memory by using at least one memory access address, confirm items of data that have a same memory address in the memory from among the read items of data, mask the confirmed items of data other than one from among the confirmed items of data, and generate a correction value for the at lest one memory address by using a weighted value based on the confirmed items of data; and an operation unit configured to perform an operation by using the at least one of the confirmed items of data and the correction value, wherein the processor is further configured to store, in the memory, data obtained by performing the operation on the confirmed data items that have not been masked to store the obtained data as at least one representative data item for the data items having the same memory address upon the bypassing of memory address alias checking for the at least one memory access address.

The processor may be further configured to determine a number of the confirmed items of data.

The data may include data regarding a weighted histogram, and the processor may be further configured to generate a weighted value by using the determined number.

The processor may be further configured to generate a correction value by using the generated weighted value.

The processor may be further configured to read the data from the memory by using a vector-gather method in which one or more incoming items of data are distributed among one or more buffers.

The processor may be further configured to store the data in the memory by using a vector-scatter method in which items of data are collected from buffers and stored as one item of data.

The memory may include at least one of a register file, a collection of memory banks of a dual port memory, and a single port memory, and the single port memory may include a write buffer and may perform memory read and memory write simultaneously.

The processor may adjust a schedule of a compiler by performing bypassing of memory address alias checking for at least one memory access address.

BRIEF DESCRIPTION OF THE DRAWINGS

These and/or other aspects will become apparent and more readily appreciated from the following description of the embodiments, taken in conjunction with the accompanying drawings in which:

FIG. 7 is a flowchart of a method of parallel processing data, according to one or more embodiments.

DETAILED DESCRIPTION

Figure 1:
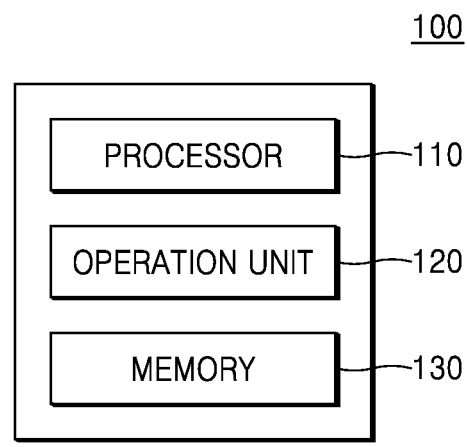
FIG. 1 is a block diagram of an apparatus for parallel processing data, according to an embodiment.

Advantages and features of one or more embodiments and methods of accomplishing the same may be understood more readily by reference to the following detailed description of the one or more embodiments and the accompanying drawings. The inventive concept may, however, be embodied in many different forms and should not be construed as being limited to the one or more embodiments set forth herein; rather, the present embodiments are provided so that this disclosure will be thorough and complete and will fully convey the inventive concept to one of ordinary skill in the art, and the inventive concept is defined by the scope of the following claims.

Terms used herein will be briefly described, and then, one or more embodiments will be described in detail.

The terms used herein are selected from among common terms that are currently widely used in consideration of their function in one or more embodiments. However, the terms may be different according to the intention of one of ordinary skill in the art, the precedent, or the advent of new technology. Also, some of the terms are discretionally selected by the applicant, and the meaning of those terms will be described in detail in the corresponding part of the detailed description. Accordingly, the terms used herein are not merely designations of the terms but are definitions based on the meaning of the terms and the content throughout the inventive concept.

Throughout the present application, when a part "includes" an element, it is to be understood that the part additionally includes other elements rather than excluding other elements as long as there is no particular opposing recitation. Terms such as "unit" or terms ending in "or" ("-or") such as processor, communicator, etc., used herein refer to a software component or a hardware component such as a field-programmable gate array (FPGA) or an application-specific integrated circuit (ASIC), and the "unit" or "-or" performs a specific function. However, the terms such as "unit" or "-or" are not limited to software or hardware. The "unit" or "-or" may configured to be in an addressable storage medium or may be configured to operate one or more processors. Accordingly, for example, the "unit" or "-or" may include components, such as software components, object-oriented software components, class components, or task components, processes, functions, attributes, procedures, subroutines, segments of a program code, drivers, firmware, a micro code, a circuit, data, a database, data structures, tables, arrays, or variables. A function provided by components and "units" or "-ors" may be associated with a smaller number of components and "units" or "-ors" or may be divided into additional components and "units" or "-ors".

Reference will now be made in detail to embodiments, examples of which are illustrated in the accompanying drawings, so that one of ordinary skill in the art may readily implement one or more embodiments. In addition, parts in the drawings that are not related to the detailed description are omitted so as not to obscure relevant details of the present embodiments. As used herein, the term "and/or" includes any and all combinations of one or more of the associated listed items.

In processor technology, there is a scalar processor using a single instruction single data method. Due to the technological development of smartphones, high resolution televisions (TVs), etc., demand for processors having excellent operation capabilities, which may perform massive data processing such as image processing or graphic rendering, has increased. Thus, vector processors using a single instruction multiple data (SIMD) method have been commonly used.

In a vector processor, a plurality of items of data are read from a memory and arranged in a vector form to perform a vector operation, and a result thereof is stored. In addition, the vector operation is performed with a vector register as an operator. The vector processor includes an operation unit that enables the vector operation to be performed and receives an input via a vector register file. The vector register file receives an input of an operator from the memory and stores the input in the memory by using a vector load/store unit that reads data from the memory and stores the data.

A size of each memory bank is determined according to the type of data accessing a memory. Each memory bank may be smaller than a datapath of a processor. A processor that supports the SIMD processes not only a word vector of a scalar but also a vector of a smaller sub-word. Operations of supporting access to different addresses that are not consecutive with respect to each unit of such a vector are referred to as scatter and gather operations.

A memory bank is determined according to the size of a scalar word. However, in order to process a histogram table as a vector with the histogram table in a memory, a size of the memory bank is determined according to a data type. When a data type of a histogram is smaller than a scalar word type, the memory has to be divided into smaller types, and accordingly, an additional area increase occurs. Also, logic for processing simultaneous access of vector types becomes complicated, and performance degradation may occur due to bank conflicts. Due to such problems, the image processing system includes a separate hardware accelerator that processes a histogram. Although this involves an area increase due to the separate hardware accelerator, the problem of performance degradation may be solved.

A process of generating a histogram table includes reading data corresponding to a bin value, performing an operation, and updating a result obtained by performing the operation to the corresponding bin of a memory. The operation performed in the case of a general histogram may be an increment operation, and the operation performed to process a weighted histogram may be multiplying a weighted value by the bin value and adding a result of the multiplication to the bin value. The table is generated while such a process of memory read, computing, and memory write is repeated, and a compiler may output better performance than in the case of checking an alias so long as scheduling is performed without checking an alias. However, this may result in outputting a wrong result. Accordingly, scheduling has to be performed conservatively but, when performed in a loop of repeated memory operations, this affects performance. In a digital signal processor (DSP), latency time with respect to the memory is long.

FIG. 1 is a block diagram of an apparatus 100 for parallel processing data, according to an embodiment.

Referring to FIG. 1, the apparatus 100 may include a processor 110, an operation unit 120, and a memory 130.

The processor 110 may read items of data from the memory 130 by using a memory access address. Also, the processor 110 may confirm items of data that have the same memory address in the memory 130 from among the read items of data. The processor 110 may determine the number of the confirmed items of data. The data may include data regarding a weighted histogram. The processor 110 may generate a weighted value by using the determined number. The processor 110 may generate a correction value by using the generated weighted value. The processor 110 may read data from the memory 130 by using a vector-gather method in which one or more incoming items of data are distributed among one or more buffers. That is, the processor 110 may read several values from the memory 130 simultaneously by using a memory access address. The processor 110 may store data in the memory 130 by using a vector-scatter method in which items of data are collected from buffers and stored as one item of data. The processor 110 may adjust a schedule of a compiler by performing bypassing.

In addition, the processor 110 may mask items of data other than one from among the confirmed items of data. Furthermore, the processor 110 may generate a correction value by using the confirmed items of data. Also, the processor 110 may store, in the memory 130, data obtained by operating on the data that has not been masked. That is, the processor 130 may store only one representative item of data with respect to the same address and may not store the items of data that have been masked.

The operation unit 120 may perform an operation by using the items of data and the correction value. The operation unit 120 may compute each of the items of data. The operation may be performed on information regarding the same address by using the correction value and the weighted value. Also, when a data operator such as a weighted histogram is additionally received, a corresponding operation may be performed.

The memory 130 may include a register file or a collection of memory banks of a dual port memory. The memory 130 may also include a single port memory, and the single port memory may include a write buffer and perform memory read and memory write simultaneously.

The memory 130 may include a dual port memory including a number of banks or a register file. When a histogram includes a small number of bins, the register file is preferred for the memory 130 in terms of area efficiency.

A method of parallel processing data, according to an embodiment, proposes a hardware operation unit in order to solve an alias problem with respect to simultaneous writing and simultaneous storing due to a plurality of data accesses when the processor 110 processes histogram data, and thus produces an effect of generating a histogram table without using a separate hardware accelerator.

Figure 2:
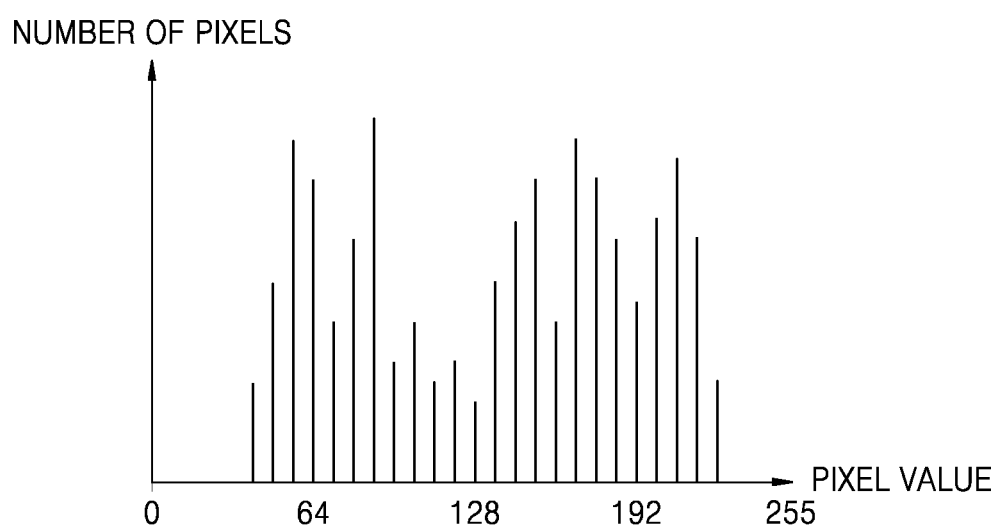
FIG. 2 illustrates histogram data as an example of parallel processing data.

FIG. 2 illustrates histogram data as an example of parallel processing data.

In an image processing application, a feature has to be selected to extract and process an object, and in this regard, a histogram is generally used. The histogram may be used to perform processing by representing frequency of values regarding shading and color of a sample of an image as a graph. When an input image is processed as a histogram, information such as brightness configuration and contrast between light and shade of the image may be obtained, and the information is used as basic information for image improvement and picture quality improvement.

FIG. 2 illustrates an example in which the number of pixels corresponding to a value from among 256 pixel values there are in an image is represented using a histogram. Referring to FIG. 2, when the histogram is set up, a memory dependency problem occurs with respect to a multiple instruction access, such as a very long instruction word (VLIW) or a coarse-grained array (CGA), or a data parallel access, such as single instruction multiple data (SIMD). A method of parallel processing data, according to an embodiment, may be performed in the case of duplicated accesses to the same address to perform masking and thus store only one data, thereby solving the memory dependency problem.

Figure 3:
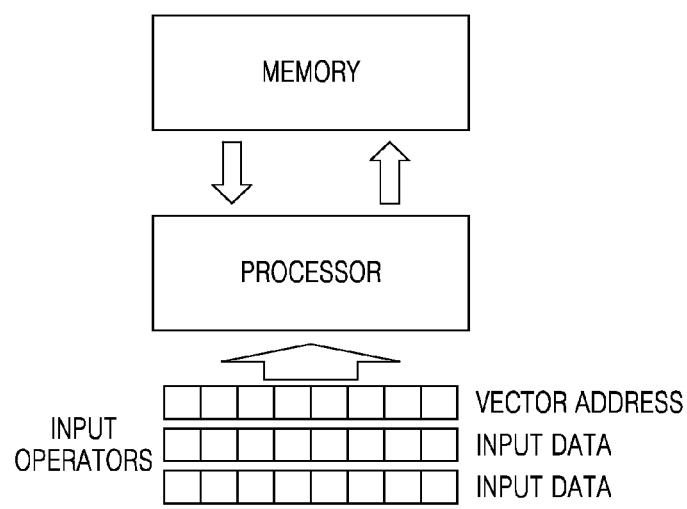
FIG. 3 illustrates a parallel processing data process, according to an embodiment.

FIG. 3 illustrates a parallel processing data process, according to an embodiment.

Referring to FIG. 3, an operation on histogram data is performed by reading values from a memory, and storing a the values in the memory. Accordingly, a command for setting up the histogram finally stores the values in the memory, and therefore, no output operator is necessary. The picture below a processor illustrates what the processor does. The processor may store items of input data in a memory that corresponds to a memory access address by using input operators. Also, the processor may read items of data from the memory by using the memory access address.

Figure 4:
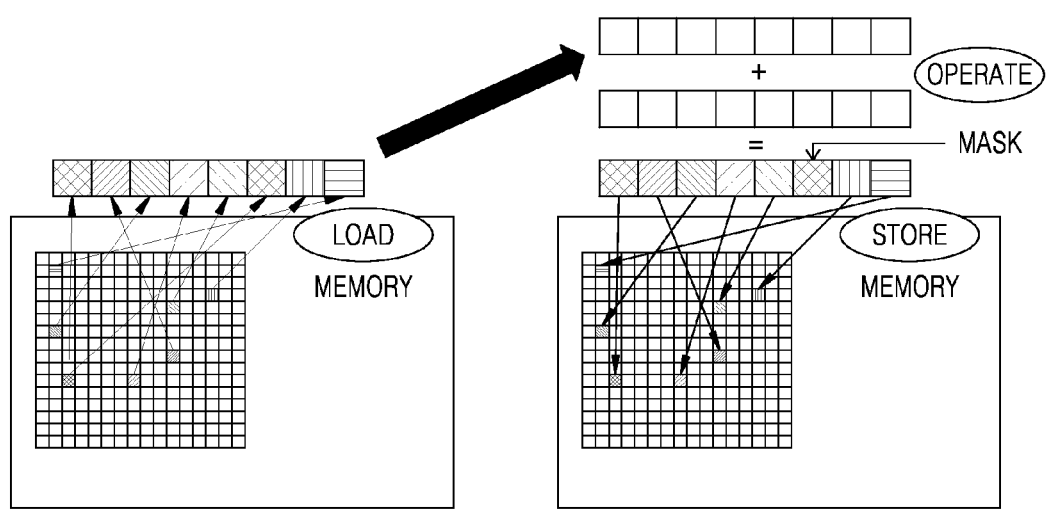
FIG. 4 illustrates a processing data process, according to an embodiment.

FIG. 4 illustrates a parallel processing data process, according to an embodiment.

FIG. 4 is an example diagram showing the method of parallel processing data. On the left of FIG. 4, a process of reading items of data from a memory by using a memory access address is shown. On the right of FIG. 4, a process of operating the items of data read from the memory is shown. Also, masking items of data that have the same memory address from among the read items of data is shown. In addition, a process is shown of storing, in the memory, data obtained by performing the operation on at least one data item that is not masked and not storing, in the memory, the data items that are masked.

Figures 5, 6:
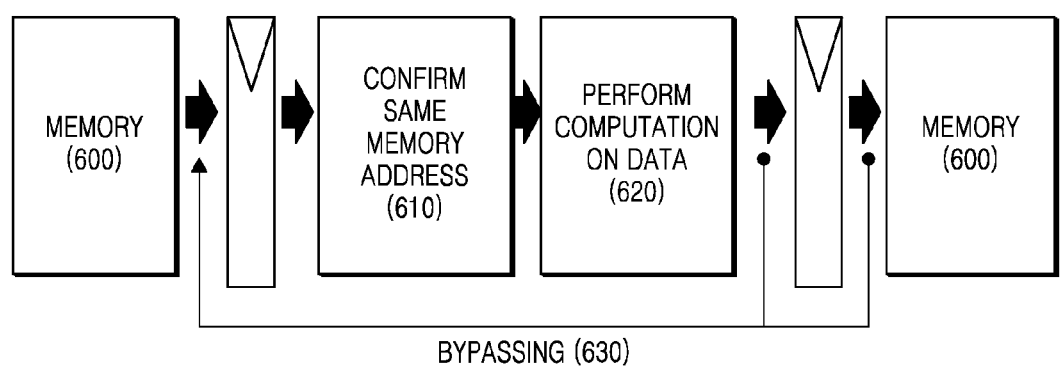
FIG. 5 illustrates code used to store values of a histogram.
FIG. 6 illustrates a parallel processing data process, according to another embodiment.

FIG. 5 illustrates code used to store a value of a histogram.

Referring to FIG. 5, a bin value of the histogram may be stored in bin[i]. A first row and a second row of code for implementing the histogram show initializing the bin value by using a "for" loop syntax. Regarding bin[i], i is increased in increments of 1 until i reaches a BIN_COUNT value, and thus, bin[i] is initialized as 0 (that is, 'bin[i]=0').

Also, in order to store, as the bin value, a data value obtained by operating, 'bin[data[i]]++' may be used to accumulate and store the bin value. That is, when the "for" sentence is used, a data value regarding data[i] may be stored as a bin[data[i]] value.

Referring to FIG. 5, generating a histogram includes two operations. One operation is initializing, and the other operation is generating a bin value. When it is possible to reset, as in the case of a register file, the initializing includes resetting and at the same time, initializing. However, in the case of a memory, the value 0 has to be stored.

In the generating of the bin value, an instruction is used. An operation of the instruction requires a memory access address for processing corresponding bins. Also, in the case of a weighted histogram other than a basic histogram, an additional data operand is necessary. A memory or a register file is read by using a memory access address, and then, whether read-memory addresses are the same as each other is confirmed. The number of items of data that have the same memory address is confirmed, and then, the bin value is updated. In this regard, the bin value is calculated by compensating for the same number of items of data. Results of the computation are stored in the same memory access address again. In this regard, results other than one may be masked so that only one representative may be stored with respect to the same bin.

FIG. 6 illustrates a parallel processing data process, according to another embodiment.

By using the method of parallel processing data, items of data may be read from a memory 600 by using a memory access address. Next, in confirming the same memory address (610), items of data that have the same memory address from among the read items of data may be confirmed. Also, items of data other than one from among the confirmed items of data may be masked. In computing data (620), an operation may be performed on the items of data read from the memory 600 by using the memory access address. Also, a correction value may be generated by using the confirmed items of data. In addition, an operation may be performed by using the data and the correction value. Next, bypassing (630) may be performed to adjust a schedule of a compiler. Accordingly, an operation may be performed on data efficiently. Data obtained by performing the operation may be stored in the memory 600. In this regard, data obtained by operating the data that has not been masked may be stored in the memory 600.

FIG. 7 is a flowchart of a method of parallel processing data, according to one or more embodiments.

In operation S700, items of data may be read from a memory by using a memory access address.

Also, the items of data may be read from the memory by using a vector-gather method in which one or more incoming items of data are distributed among one or more buffers.

In operation S710, items of data that have the same memory address from among the read items of data may be confirmed.

In operation S720, items of data other than one from among the confirmed items of data may be masked.

In operation S730, a correction value may be generated by using the confirmed items of data. The data may include data regarding a weighted histogram. Also, the number of confirmed items of data may be determined. A weighted value may be generated by using the determined number. The correction value may be generated by using the generated weighted value.

In operation S740, an operation may be performed by using the items of data and the correction value.

In operation S750, data obtained by operating on the data that has not been may be stored in the memory. The data may be stored in the memory by using a vector-masked scatter method in which items of data are collected from buffers and stored as one item of data. The memory may include a register file or a collection of memory banks of a dual port memory.

The apparatuses according to the present embodiments may include a processor, a memory for storing and executing program data, a permanent storage device such as a disk drive, a communication port for communicating with an external device, and user interface (UI) devices such as a touch panel, keys, and buttons. Methods implemented by a software module or algorithm may be stored on a non-transitory computer-readable recording medium as computer-readable codes or program commands that are executable on the processor. Examples of the non-transitory computer-readable recording medium include magnetic storage media (e.g., read-only memories (ROMs), random-access memories (RAMs), floppy disks, and hard disks) and optical recording media (e.g., compact disk-read only memories (CD-ROMs) and digital versatile disks (DVDs)). The non-transitory computer-readable recording medium may also be distributed over network-coupled computer systems so that the computer-readable codes may be stored and executed in a distributed fashion. A medium may be read by a computer, stored in a memory, and executed in a processor.

One or more of the present embodiments may be described in terms of functional block components and various processing operations. Such functional blocks may be implemented by any number of hardware and/or software components that execute particular functions. For example, one or more embodiments may employ various integrated circuit (IC) components, such as memory elements, processing elements, logic elements, and lookup tables, which may execute various functions under the control of one or more microprocessors or other control devices. Similarly, where the elements are implemented by software programming or software elements, one or more of the present embodiments may be implemented by any programming or scripting language such as C, C++, JAVA, or assembly language, with various algorithms being implemented by any combination of data structures, processes, routines, or other programming elements. Functional aspects may be implemented by an algorithm that is executed in one or more processors. Also, one or more of the present embodiments may employ the related art for electronic environment setting, signal processing, and/or data processing. Terms such as "mechanism," "element," "unit," and "configuration" may be used in a broad sense and are not limited to mechanical and physical configurations. The terms may include the meaning of a series of software routines in conjunction with processors or the like.

Particular implementations described in one or more of the present embodiments are merely exemplary and do not limit the technical scope in any way. For the sake of conciseness, descriptions of electronic configurations of the related art, control systems, software, and other functional aspects of the systems may be omitted. Also, connection of lines or connection members between elements illustrated in the drawings represent exemplary functional connections and/or physical or logical connections between the elements, and various alternative or additional functional connections, physical connections, or logical connections may be present in a practical apparatus.

The use of the terms "a," "an," and "the" and similar referents in the context of the present specification (especially in the context of the following claims) may be construed to cover both the singular and the plural. Also, recitation of a range of values herein is merely intended to serve as a shorthand method of referring individually to each separate value falling within the range, unless otherwise indicated herein, and each separate value is incorporated into the specification as if it were individually recited herein. Also, operations of the method described herein may be performed in any suitable order unless otherwise indicated herein or otherwise clearly contradicted by the context. The scope is not limited to the order in which the operations are described. All examples or exemplary terms (e.g., "such as") provided herein are merely used to describe the technical spirit in detail, and the scope is not limited by the examples or exemplary terms unless otherwise claimed. Also, it will be understood by one of ordinary skill in the art that various modifications, combinations, and changes may be made according to design conditions and factors without departing from the spirit and scope as defined by the following claims.

What is claimed is:

1. A method of parallel processing data using bypassing of memory address alias checking, the method comprising:
by a processor:
reading items of data from a memory by using at least one memory access address and confirming, from among the read items of data, data items that have a same memory address in the memory;
adjusting an operating schedule of a compiler of the processor by performing the bypassing of memory address alias checking for the at least one memory access address;
masking the confirmed data items except for not masking at least one of the confirmed data items;
generating a correction value for the at least one memory access address by using a weighted value based on the confirmed data items;
performing an operation by using the at least one of the confirmed data items and the correction value; and
storing, in the memory, data obtained by performing the operation on the at least one of the confirmed data items that has not been masked to store the obtained data as at least one representative data item for the data items having the same memory address upon the bypassing of memory address alias checking for the at least one memory access address.

2. The method of claim 1, wherein the generating of the correction value comprises determining the number of confirmed data items.

3. The method of claim 2, wherein the items of data comprise data regarding a weighted histogram, and
the weighted value is generated by using the determined number of confirmed data items.

4. The method of claim 1, wherein the reading comprises reading the items of data from the memory by using a vector-gather method in which items of data are distributed among buffers.

5. The method of claim 1, wherein the storing comprises storing the obtained data in the memory by using a vector-scatter method in which items of data are collected from buffers and stored as at least one item of data.

6. The method of claim 1, wherein the memory comprises at least one of a register file, a collection of memory banks of a dual port memory, and a single port memory which comprises a write buffer and is capable of performing memory read and memory write simultaneously.

7. A non-transitory computer-readable recording medium having recorded thereon a computer program for executing the method of claim 1.

8. An apparatus for parallel processing data using bypassing of memory address alias checking, the apparatus comprising:
a processor configured to:
read items of data from a memory by using at least one memory access address,
confirm, from among the read items of data, data items that have a same memory address in the memory,
adjust an operating schedule of a compiler of the processer by performing the bypassing of memory address alias checking for the at least one memory access address,
mask the confirmed data items except for not masking at least one of the confirmed data items, and
generate a correction value for the at least one memory access address by using a weighted value based on the confirmed data items; and
an operation unit configured to perform an operation by using the at least one of the confirmed data items and the correction value,
wherein the processor is further configured to store, in the memory, data obtained by performing the operation on the at least one of the confirmed data items that has not been masked to store the obtained data as at least one representative data item for the data items having the same memory address upon the bypassing of memory address alias checking for the at least one memory access address.

9. The apparatus of claim 8, wherein the processor is further configured to determine the number of confirmed data items.

10. The apparatus of claim 9, wherein the items of data comprise data regarding a weighted histogram, and
the weighted value is generated by using the determined number of confirmed data items.

11. The apparatus of claim 8, wherein the processor is further configured to read the items of data from the memory by using a vector-gather method in which items of data are distributed among buffers in the memory.

12. The apparatus of claim 8, wherein the processor is further configured to store the obtained data in the memory by using a vector-scatter method in which items of data are collected from buffers in the memory and stored as at least one item of data.

13. The apparatus of claim 8, wherein the memory comprises at least one of a register file, a collection of memory banks of a dual port memory, and a single port memory, which comprises a write buffer and is capable of performing memory read and memory write simultaneously.

* * * * *